United States Patent [19]

Jordan

[11] 4,254,470

[45] Mar. 3, 1981

[54] INTERPOLATING DIGITAL DATA PROCESSING APPARATUS FOR CORRELATION-TYPE FLOW MEASUREMENT

[75] Inventor: James R. Jordan, Dunfermline, Scotland

[73] Assignee: Sybron Corporation, Rochester, N.Y.

[21] Appl. No.: 935,794

[22] Filed: Aug. 22, 1978

[30] Foreign Application Priority Data

Aug. 22, 1977 [GB] United Kingdom ............... 35175/77

[51] Int. Cl.³ .......................... G06G 7/30; G06F 7/02
[52] U.S. Cl. .................................. 364/577; 364/510; 364/728; 235/92 FL
[58] Field of Search ............... 364/510, 723, 577, 728, 364/824; 73/194 R; 235/92 MT, 92 FL

[56] References Cited

U.S. PATENT DOCUMENTS

| | | | |
|---|---|---|---|
| Re. 28,686 | 1/1976 | Coulthard | 364/510 |
| 3,402,606 | 9/1968 | Bruha | 364/510 |
| 3,412,240 | 11/1968 | Hunt et al. | 364/723 |
| 3,777,133 | 12/1973 | Beck et al. | 364/510 |
| 3,810,113 | 5/1974 | Jordan | 364/728 |
| 3,840,174 | 10/1974 | Craft | 364/577 |
| 3,846,625 | 11/1974 | Sasayama | 364/723 |
| 3,862,405 | 1/1975 | Beck | 364/510 |
| 4,019,038 | 4/1977 | Critten et al. | 364/510 |
| 4,025,775 | 5/1977 | Beauvais et al. | 364/728 |
| 4,097,801 | 6/1978 | Freeman et al. | 364/728 |

*Primary Examiner*—Charles E. Atkinson
*Assistant Examiner*—Gary Chin
*Attorney, Agent, or Firm*—Theodore B. Roessel; Joseph C. MacKenzie

[57] ABSTRACT

Interpolating apparatus is provided for more accurately determining the peak position of a function, particularly a cross-correlation function derived from two related flow signals fed to an overloading counter correlation flowmeter, whereby the peak position is indicated by a set of signals corresponding to quantized values of a parameter and the apparatus interpolates the peak position from selected signals of the set. The preferred method of operation comprises computing for each of the signals an average of the quantized values of the parameter corresponding to that signal, and summing a predetermined number of these average values to obtain an indication of an interpolated value of the peak position. Various output circuits are provided for flowmeter applications to produce an output which is proportional to flow rate.

16 Claims, 7 Drawing Figures

INTERPOLATING DIGITAL DATA PROCESSING APPARATUS FOR CORRELATION-TYPE FLOW MEASUREMENT

The present invention relates to digital data processing apparatus, particularly to digital interpolating apparatus, and more particularly for use in certain techniques of flow measurement.

In many applications, it is necessary to monitor a varying function and to determine when a peak value is achieved. The output indication of such a detected peak position obtained from a digital system using shift registers to generate a quantised time delay axis moves in discrete steps in response to a smooth variation of the peak position. Further, if the quantity to be measured is inversely proportional to the time delay, such as when a velocity or rate of increase of some value is being measured, high values of that quantity will correspond to very low values of time which will be vary close to the origin and hence exhibit very poor resolution.

One example which utilises such a technique is disclosed in U.K. Pat. No. 1,401,009 (N.B., reference may also be had to its U.S. equivalent U.S. Pat. No. 3,810,113, May 7, 1974, which has the same disclosure) which, when used for flow measurement is known as an overloading counter correlation flowmeter. This system makes use of the fact that two signals derived from flow of a fluid, one signal being derived upstream of the other, exhibit a degree of correlation with one signal being delayed by the time taken for the fluid to travel between the two signal deriving points. If this time can be measured, the flow velocity is simply the distance between the two points divided by the measured time. Cross-correlation techniques between the two signals can be used by delaying one signal with respect to the other for various values of time delay and measuring the value of time delay corresponding to the maximum degree of cross-correlation. If digital techniques are used, a shift register may provide a quantised time delay axis and since the flow velocity is inversely proportional to time delay, only a very coarse output indication will be obtained at high flow rates as described above.

Resolution may be improved by increasing the number of delay stages provided in the shift register but this can only be achieved by considerably increasing the number of components used in the circuit.

It is therefore an object of the invention to provide interpolating apparatus for more accurately determining the peak position of a function which has been coarsely located using digital techniques.

It is a further object of the invention to provide a method and apparatus for detecting one or more flow parameters utilising an interpolation technique in conjunction with an overloading counter correlation technque.

The present invention provides apparatus for measuring at least one parameter of the flow of a fluid, which comprises means for detecting first and second related signals at different positions along said flow, a shift register having a serial input responsive to said first signal for delaying said first signal by a plurality of quantised delay times in a plurality of storages in the shift register, a set of counters corresponding to different stages of the shift register, and there being gating means operative to cause each counter to count, out of a sequence of successive occasions, only those occasions on which there occurs, in respect of the corresponding stage, a coincidence between the delayed first signal in that stage and said second signal. Said apparatus also comprises a pattern register operable to take in information for each of a sequence of instants, said information indicating for which of the stages the count has reached a given number at that instant and to store that information temporarily. Said apparatus further comprises means for deriving a sequence of signals from the pattern register, said sequence of signals respectively corresponding to said sequence of instants and each of the last said signals having a form indicating the quantised delay time corresponding to any and every stage for which the count has reached said given number at the corresponding one of the last said instants, and means for interpolating a signal value representative of delay time, the last said value being from said sequence of signals indicating said quantised delay times, whereby to provide an indication of said at least one flow parameter.

The present invention further provides interpolating apparatus for use with a data processing system which system provides a sequence of signals corresponding to a sequence of instants indicating for which of a set of quantised values of a parameter a given condition has been satisfied at each instant, the interpolating apparatus comprising means for receiving a predetermined number of said sequence of signals, computing means responsive to each of said received signals to compute for each signal a value indicative of the average of the quantised values corresponding to that signal, means for adding each of the computed values together, and means for producing an output signal when the computed values corresponding to all the predetermined number of received signals have been added together, said output signal providing an indication of an interpolated value of said parameter.

In order that the present invention be more readily understood, an embodiment thereof will now be described, by way of example, with reference to the accompanying drawings, in which.

In order to determine the time delay between two related signals $x(t)$ and $y(t)$ both of which are dependent on the time $t$, it is theoretically necessary to compute the cross-correlation function $$\frac{1}{T} \int_0^T x(t) y(t - \tau) \, dt$$

for all possible values of the delay parameter $\tau$, and distinguish that value of $\tau$ for which the cross-correlation function has its maximum value. T is the integration time which should be of sufficient magnitude to minimise random effects. In the apparatus shown in FIG. 1, use is made of the polarity form of the function $$\frac{1}{T} \int_o^T \frac{x(t)y(t-\tau)}{|x(t)| \, |y(t-\tau)|} \, dt$$

Furthermore, rather than performing a time integration, numerical counting of the signals sampled at discrete intervals is performed. Finally, the function, represented by the numerical count, is evaluated only for a set of quantised values of the delay parameter $\tau$ which are defined by the composition of the delay shift register.

Figure 1:
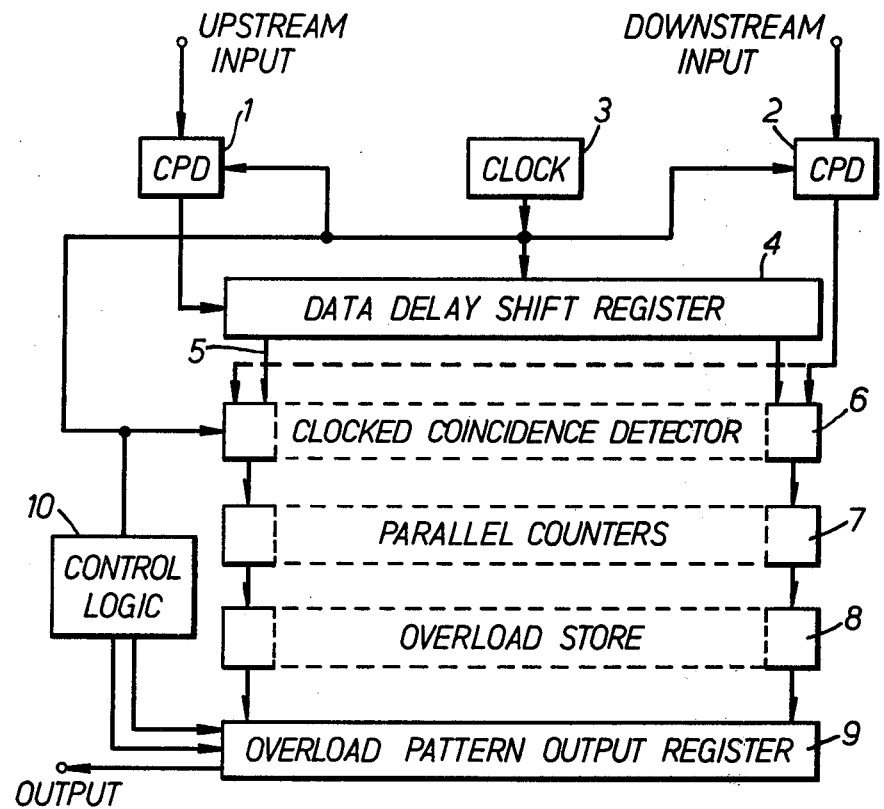
FIG. 1 shows a block diagram of an overloading counter correlation flowmeter in combination with which the invention may be used.

With reference to FIG. 1, upstream and downstream analogue signals, derived from transducers located along a path of fluid flow, are fed to the inputs of two clocked polarity detectors, 1 and 2 respectively. The polarity detectors provide a binary indication of the polarity of the received analogue signals each time a clock pulse is received from a clock 3. The binary indication of the downstream signal is compared with a plurality of delayed versions of the indication of the upstream signal. This is achieved by serially passing the upstream indication through a data delay shift register 4 which has a set of parallel outputs 5, one output correspondingly to each delay stage. Each of the outputs 5 is compared with the downstream indication from the polarity detector 2 in gating means, shown in FIG. 1 as a clocked coincidence detector 6, which comprises a plurality of stages, one corresponding to each delay stage of the shift register 4. The detected coincidence conditions are counted by a set of parallel counters 7, each of which counts to a preset number. When a counter overloads through its preset capacity, a signal is fed to the corresponding stage of an overload store 8. Thus the first counter to overload indicates the stage in the shift register 4 which corresponds to the delay at which the correlation function is a maximum. If the counting of coincidence conditions is allowed to proceed after this peak has been detected then more counters will progressively overload, and a pattern of overload states will be produced. These are fed to an overload pattern output register 9, which is a parallel input/serial output shift register (PISOSR). The register 9 is responsive to signals from control logic 10 which is itself responsive to clock pulses from the clock 3. Therefore in response to the control logic 10, a series of successive overload patterns appear serially at the output of the register 9. Further details of the exact construction and operation of such a device are given in U.K. Pat. No. 1,401,009 or U.S. Pat. No. 3,810,113, each of which is incorporated herein by reference.

Figure 2:
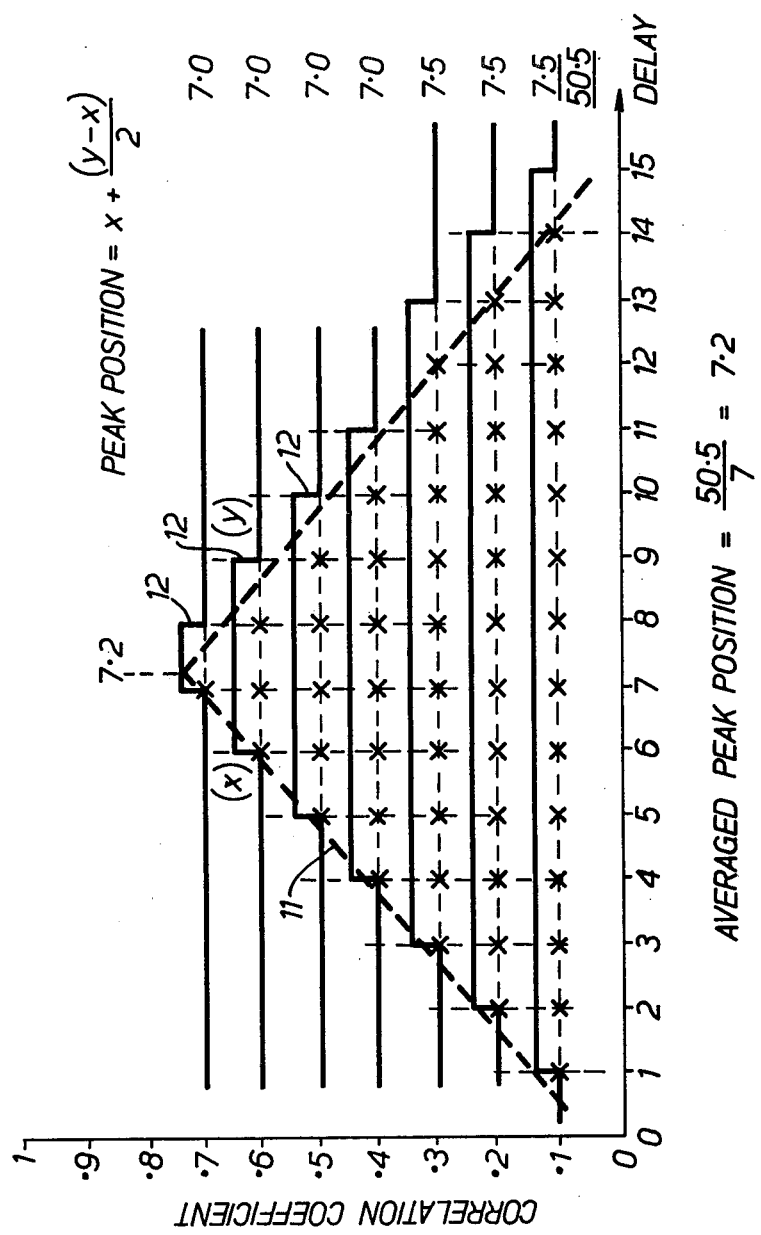
FIG. 2 is a diagram showing overload patterns produced by the apparatus of FIG. 1 and illustrating the interpolation method.

FIG. 2 shows a waveform having a peak value the waveform being generally symmetrically disposed about the peak position and represented by broken line 11. Experimental results have indicated that a correlation function derived from flow measurement is symmetrical about the peak position provided that integration or summation times are sufficient to counteract random statistical variations. In the case of the overloading counter correlation flowmeter of FIG. 1, each of the numbers along the delay axis represents one of the stages of the delay shift register 4. In operation, the coincidence detector 6 compares signals, the counters 7 sum coincidences for each stage, and the overload store 8 receives an indication when the counters 7 exceed the preset overload count. In the example of FIG. 2, the delay stage corresponding to the number 7 on the delay axis is the first to overload, the point being marked with a cross at a correlation coefficient reading of 0.7. The following clock pulse produces an overload pattern (at correlation coefficient =0.6) of delay stages corresponding to numbers 6 to 8, and subsequent clock pulses produce further overload patterns. These patterns are fed serially out of the output register 9 as pulses 12, commencing with the first overload pattern which is the uppermost pulse. It will be noted that this pulse represents the peak value of the waveform 11. However, the exact position of the peak within the pulse is not actually defined.

In order to more accurately locate the position of the peak, interpolation can be performed and the preferred method is hereinafter described.

Considering the waveform 11 shown in FIG. 2, let x and y be the lowest and highest delay values respectively of each pulse 12. The crosses indicate which counters have overloaded for a particular value of correlation coefficient. It will be noted that each pulse 12 terminates at the next delay value after y. This trailing edge of the pulse is a result of the electronics of the apparatus and does not represent an overload at that value.

Assuming the waveform 11 to be symmetrically disposed about the peak position, for each pulse 12, the peak position may be estimated using the formula:

$$\text{Peak position} = \chi + \frac{(y - \chi)}{2}$$

An interpolated peak position is obtained by averaging a number of these estimated peak positions.

Figure 3:
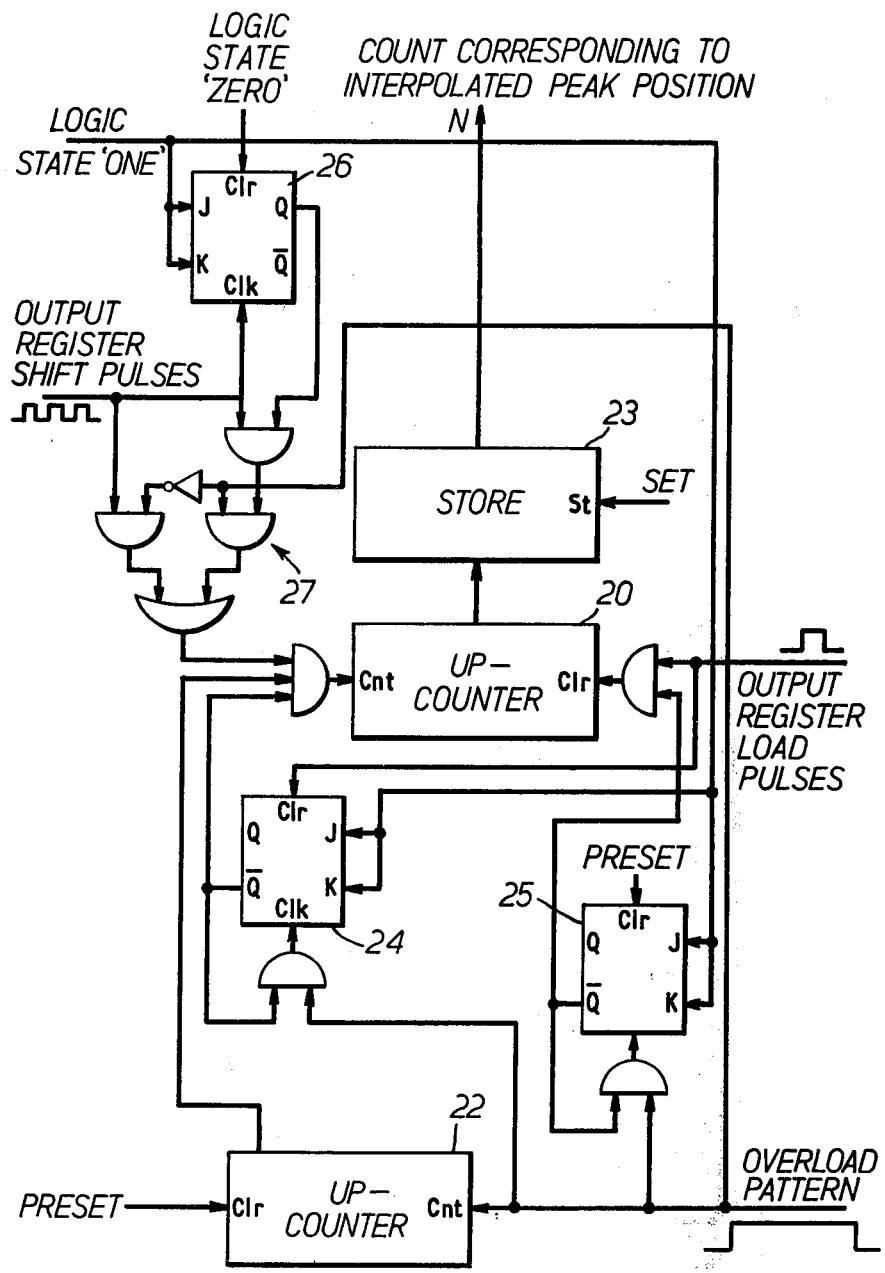
FIG. 3 shows a block diagram of an embodiment of the invention for carrying out the interpolation method shown in FIG. 2.

Referring now to FIG. 3, this shows in block diagram form apparatus for carrying out the estimation and interpolation using data obtained from apparatus such as shown in FIG. 1. The apparatus is preferably designed to carry out a predetermined number of operations and then recycle, each operation being controlled by the pulses 12 output by the register 9 and other control signals derived from the control logic 10. Control logic 10 produces output register shift pulses to clock the register 9, and also output register load pulses to indicate that a full range of stages, and hence an overload pattern, has been serially output and a subsequent pattern is about to be produced. The apparatus could be arranged to process one range of overload patterns only and this may be suitable in some steady state applications; however, as stated above, in flowmeter applications it is preferred that the apparatus repeatedly recycle at the end of a predetermined number of operations. Each operation comprises counting pulses at a first rate for a first portion of the operation, counting pulses at a second rate which is half the first rate for a second portion of the operation, adding the two pulse counts together and storing the result.

Figure 4:
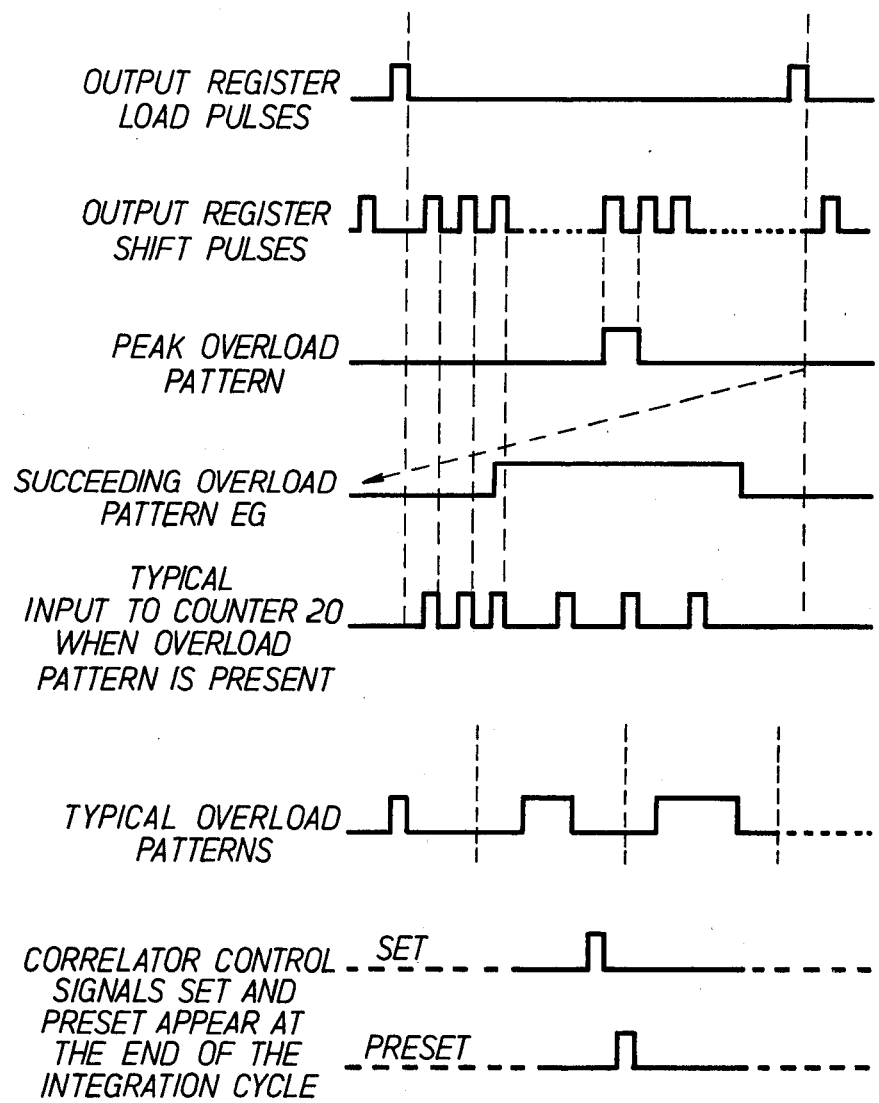
FIG. 4 shows waveforms at selected points in the apparatus shown in FIG. 3.

The operation of the circuit shown in FIG. 3 will now be described in detail with reference to FIG. 4 and in relation to its use with a correlation flowmeter as, for example, shown in FIG. 1. At the start of operations, the counters 20 and 22 are cleared, as is the store 23. This is a result of 'set' and 'preset' pulses which are produced at the end of each integration cycle by the control logic 10 as shown in FIG. 4. By this means, the counters 7 of FIG. 1 are also cleared and reset to zero at the end of each cycle if the preferred mode of repeated recycling is being implemented. Until an overload is detected by the correlation flowmeter, the $\overline{Q}$ outputs of flip-flops 24 and 25 and the output of the counter 22 are held at a logic 1, hence output register shift pulses from control logic 10 fed to the clock input of a flip-flop 26 are counted by the counter 20. This counter is cleared periodically by an output register load pulse from the control logic 10 of the flowmeter except when an overload has been detected, in which case flip-flop 25 changes state at the end of an overload pattern pulse to inhibit clearing of the counter 20 by the output register load pulse. The output of the flip-flop 24 also changes state on the negative edge of an overload pattern pulse and therefore the counter 20 can only count output register shift pulses up to a point corresponding to the negative edge of the overload pattern.

In the presence of an overload pattern pulse, the logic elements 27 connected to the output of the flip-flop 26 and receiving the output register shift pulses allow only every second shift pulse to be counted by the counter 20. Thus, the counter 20 first counts pulses at the same rate as the output register shift pulses appear, which count represents a value of x but in the presence of an overload pattern then counts pulses at half the rate of the output register shift pulses to the end of the overload pattern, which further count then represents a value of $(y-x)/2$. For each pulse 12, the counter 20 thus produces an output indicative of an estimated peak position. The waveforms at various locations in the circuit including the input to counter 20 are shown in FIG. 4. After a predetermined number of operations, each as above, the counter 22 goes to a logic 0 and stops the counter 20 summing any further estimated peak positions. The predetermined number of operations is preferably a binary number (e.g. 8 or 16) as this allows N, the count corresponding to the interpolated average peak position to be easily obtained by a shift operation of the total count of all the operations in the counter 20 prior to storage in the store 23. This is then equivalent to dividing the sum of all the estimated peak positions by the number of estimated peak positions to obtain an interpolated average as in FIG. 2.

The overload pattern input to the interpolator will be selected to cover a range of correlation coefficient values. It is not necessary that the first overload pattern should correspond to the peak value, eg. highest pulse 12 of FIG. 2. However, the patterns selected will preferably constitute the top part of the correlation function where random variations are at a minimum and false peaks can therefore be avoided. For example, in table I of U.K. Pat. No. 1,401,009, only the outputs corresponding to pulses nos. n, n+1, n+2, n+3 would be selected. As stated above, for a valid interpolation, it is necessary that the function be symmetrical about its peak function. A long integration time compared to the time between each clock pulse will provide a symmetrical peak at the top part of the function and still produce a sufficient number of overload patterns to allow a valid interpolation to take place. The example in the table quoted above is for illustration only; in practice more overload patterns would be required for an accurate interpolation.

An output proportional to flow rate is obtained by taking the reciprocal of the interpolated and averaged peak position. An instrument having a long delay time between output indications will exhibit coarse resolution characteristics under changing flow velocity conditions. A long integration time is required to give adequate definition to the function peak but this can be offset by averaging the results of the short-term peak positions in some form of digital filter circuit to give a result similar to that obtained by long-term correlation under steady state conditions, but possessing some limited tracking ability when the flow changes.

Figure 5:
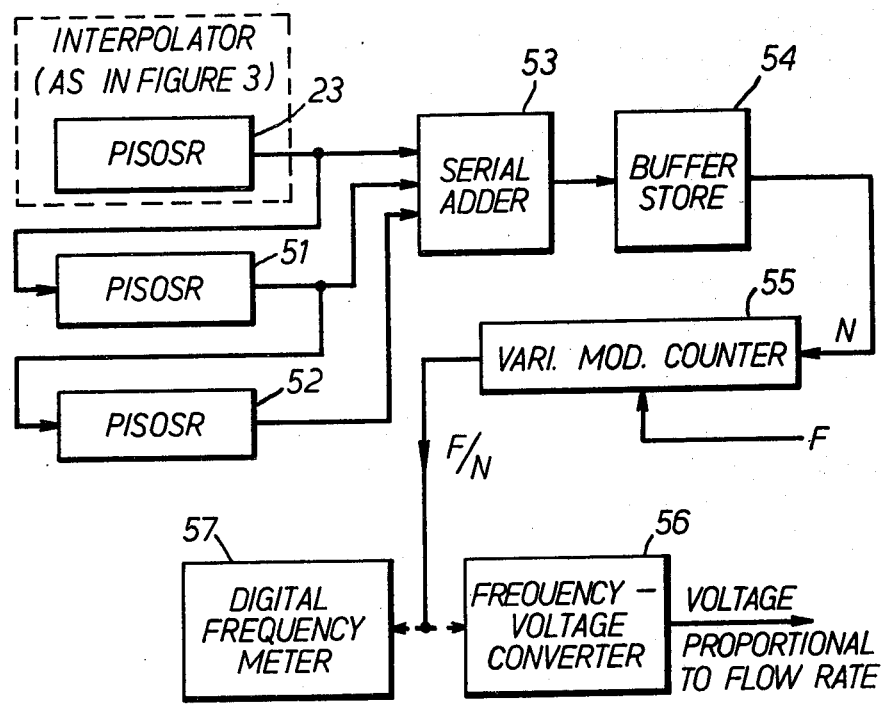
FIG. 5 shows a block diagram of an output circuit for use with the apparatus shown in FIG. 3.

FIG. 5 shows a digital output circuit which preserves the total digital character of the flowmeter system. A three point averaging filter has been implemented using three parallel in/serial out shift registers (PISOSR) where one comprises the store 23 and two others 51, 52 are connected in a series chain, and a serial adder circuit 53. With this arrangement a 3-second integration time could, for example, be realised by the cross-correlator and interpolator operating with a 1-second integration time. Hence the output indication will start to move towards its steady-state value soon after a flow valve has been opened.

The registers 23, 51, 52 hold three counts, each representative of succeeding interpolated peak positions. It will be noted that serial in/parallel out converters will need to be interposed between registers. Therefore at any moment register 23 will hold the current count, register 51 will hold the count of the preceding integration, and register 52 will hold the count of the last preceding integration. These three counts are then fed simultaneously to the serial adder 53 to provide a count indicative of the average peak position. The output from the buffer store 54 storing the output from the serial adder 53 addresses the count control input of a variable modulus counter 55. Let N be the count representative of the interpolated and filtered peak position and F be the input clock frequency, then the counter output frequency F/N will be proportional to flow velocity. A frequency voltage converter 56, which generates a voltage proportional to flow rate, or a digital frequency meter 57 can be used to generate the output indication.

Figure 6:
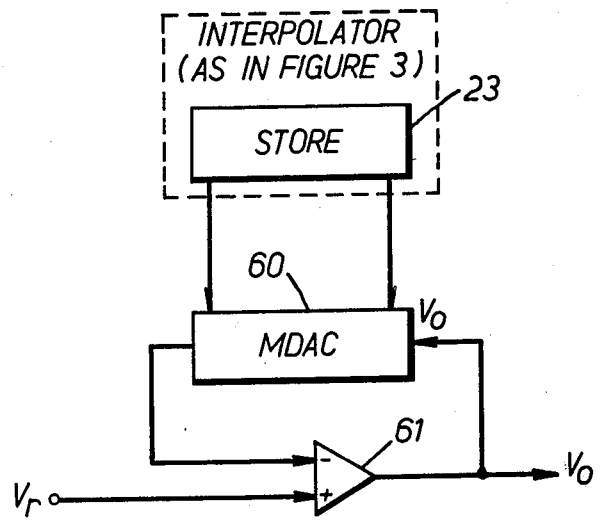
FIG. 6 shows a further output circuit for use with the apparatus shown in FIG. 3.

An alternative output circuit based on the use of multiplying digital to analogue converters (MDAC's) is shown in FIG. 6 and may be attractive for applications requiring limited output range. FIG. 6 illustrates the use of an MDAC 60 in a hybrid divider circuit. The output of MDAC 60 is connected to the inverting input of a differential amplifier 61. A reference voltage $V_r$ is fed to the non-inverting input of amplifier 61. The output of amplifier 61 is connected to the input of the MDAC 60. Therefore if $V_o$ is the output voltage of amplifier 61, the output of the MDAC 60 will be $$\frac{NV_o}{N_{mx}+1}$$

where N is the count in the store 23 and $N_{mx}$ is the maximum expected count. This voltage is then fed to the inverting input of the differential amplifier, therefore $$V_o = \frac{N_{mx}+1}{N} \cdot V_r.$$

Thus $V_o$ is proportional to the flow rate. High quality MDAC's are required in this circuit because when the correlation function peak is closed to the origin the MDAC/differential amplifier combination forms a high gain amplifier whose output is sensitive to small variations of the parameters of the MDAC.

Figure 7:
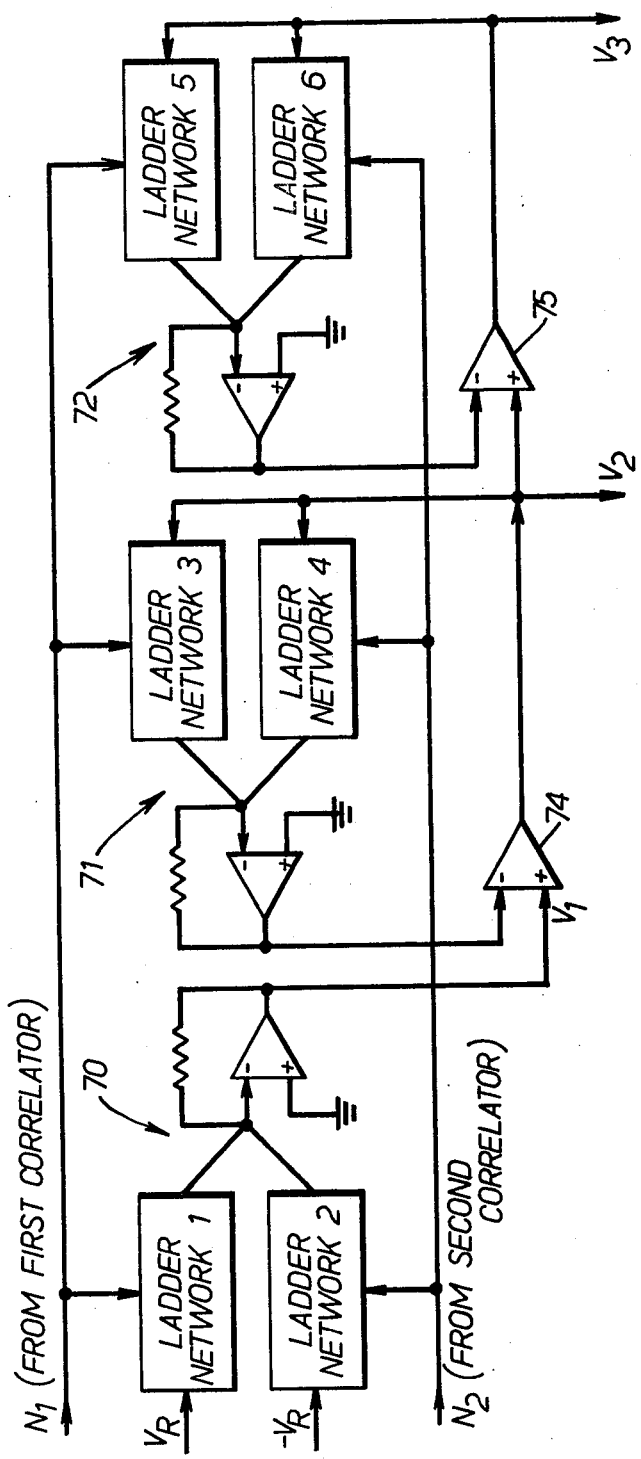
FIG. 7 shows a block diagram of an output circuit using two circuits as shown in FIG. 3 for providing further information.

It can be shown that two correlators used in association with an optical transducer system for providing two sets of upstream and downstream signals as shown in FIG. 1 can be used to monitor the volume flow rate and depth in open channels. In this case, three transducers may be sufficient, two for providing one each of the input signals to each correlator, and one for providing a common input signal to both correlators. The following equations have been derived:

$$h = \text{depth} = \frac{K_2(T_1 - T_2)}{(T_1 + T_2)}$$

and $$Q = \text{volume flow rate} = \frac{K_1(T_1 - T_2)}{(T_1 + T_2)^2}$$

where $K_1$ and $K_2$ are constants and $T_1$ and $T_2$ are peak positions derived from the two correlators. These equations are ideally suited to implementations based on the use of the MDAC., FIG. 7 illustrates an implementation of the open channel equations using MDAC circuits. The circuit requires 6 ladder network/differential amplifier pairs forming 3 MDAC's and two correlator circuits as shown in FIG. 3. Since two MDAC's would be required for output generation if the equations had been implemented using a microprocessor system the amount of extra components required is very small.

$N_1$ and $N_2$ are the counts produced by the two correlators, and are representative of the two peak positions of the correlators, $T_1$ and $T_2$. $N_1$ and $N_2$ are therefore directly proportional to $T_1$ and $T_2$ respectively. Three converters 70, 71 and 72 are provided for implementing the above equations and are similar in constitution except that converter 70 includes means for providing a positive reference voltage $V_R$ for feeding to a ladder network 1 and a negative reference voltage equal in magnitude to $V_R$ which is fed to a ladder network 2. $N_1$, the count from one correlator is fed to ladder networks 1, 3 and 5, while $N_2$, the count from the second correlator is fed to ladder networks 2, 4 and 6. The converter 70 therefore produces a multiplying factor proportional to $(N_1-N_2)$, and its output $V_1$ is thus $$V_1 = \frac{N_1 - N_2}{N_{mx} + 1} \cdot V_R$$

where $N_{mx}$ is, as above, the maximum expected count. $V_1$ is then compared in a comparator 74 with a voltage produced by converter 71 which is proportional to a multiplying factor of $(N_1+N_2)$ to generate an output $V_2$ where $$V_2 = \frac{N_{mx} + 1}{N_1 + N_2} \cdot V_1 = \frac{N_1 - N_2}{N_1 + N_2} \cdot V_R$$

$V_2$ is therefore directly proportional to the depth h. $V_2$ is then compared in a comparator 75 with a voltage produced by converter 72, which is identical to converter 71, to generate an output $V_3$ where $$V_3 = \frac{N_{mx} + 1}{N_1 + N_2} \cdot V_2 = \frac{N_1 - N_2}{(N_1 + N_2)^2} \cdot (N_{mx} + 1) V_R$$

$V_3$ is therefore directly proportional to the flow rate Q, and so by using this output circuit in conjunction with two correlators, two additional flow parameters may be obtained.

A similar scheme can be derived using variable-modulus counters and binary rate multiplier techniques. However, this approach will require a considerable amount of additional logic and will also suffer from problems associated with large frequency divisions required by large output range systems. A special purpose integrated circuit could be designed using a commercially available uncommitted logic array approach or by a specially designed MOSIC. If a fully digital approach is required it will probably be more attractive to consider the use of a microprocessor system.

I claim:

1. Apparatus for measuring at least one parameter of the flow of a fluid comprising means for transducing first and second signals from said flow at different positions along said flow;

shift register means for receiving said first signal, and being responsive to said first signal for delaying said first signal by a plurality of quantised delay times by means of a corresponding plurality of stages in said shift register means;

gating means for receiving said second signal and comparing it to said first signal each time the latter is delayed, said gating means being responsive to coincidence between compared signals for producing a coincidence signal each time there is an occurrence of said coincidence;

a set of counters corresponding to the several stages of said shift register means;

said gating means being operative to cause said counters to count occurrence of said coincidence signal with each of said counters counting only occurrences of coincidence between said second signal and a said first signal delayed by an amount of delay which corresponds to the shift register means stage corresponding to the said each of said counters;

each of said counters being responsive to its count to produce an overload signal when said count has reached a given number, whereby the first of said counters to produce an overload signal identifies a quantised value of the actual time it took fluid to flow from one of said positions to the other;

and means for interpolating said quantised value and making it more representative of said actual time, whereby to provide for improved resolution of indication of said flow parameter, the last said means comprising control means for causing comparison of said first signals delayed and said second signal to occur sufficiently often that every said counter overloads and computing means operatively connected to said control means for averaging the quantised delay times represented by said counters, thereby to provide a more representative value of said actual time.

2. Apparatus according to claim 1, wherein said control means is operable repeatedly to restore all the counters to a condition of zero count and thereby cause the apparatus to operate in repeated cycles.

3. Apparatus according to claim 1 wherein said last said means includes pattern register means for producing signals each of which corresponds to quantized delay time and which are received by said computing means and said computing means includes means responsive to each of said received signals to compute for each signal a value indicative of the average of the quantised delay times corresponding to that signal, means for adding each of the computed values together, and means for producing an output signal when the computed values corresponding to all of a predetermined number of received signals have been added together, said output signal providing an indication of said more representative value.

4. Apparatus according to claim 3, wherein said computing means comprises means for detecting said received signals, pulse generating means responsive to said detecting means for generating pulses at a first frequency before one of said received signals has been detected and to generate pulses at a second frequency which is half of the first frequency when said one of said received signals has been detected, means for counting pulses generated by said pulse generating means, and inhibiting means responsive to said detecting means for inhibiting said counting means at the termination of said predetermined number of said received signals, wherein the contents of said counting means at said termination provide said output signal.

5. Apparatus according to claim 1, 3, 4 or 5 further comprising means for deriving a voltage inversely proportional to said more representative value of actual time to provide an indication of the rate of said fluid flow.

6. Apparatus according to claim 2, 3 or 4 further comprising storage means for storing at least one interpolated value derived during at least one preceding cycle and averaging means for averaging said at least one interpolated value with the interpolated value derived during the current cycle.

7. A method of measuring at least one parameter of flow of a fluid including the steps of:
transducing first and second related signals from said flow at different positions along said flow,
delaying said first signal by a plurality of quantised delay times to provide a plurality of delayed signals,
counting occasions on which there occurs in respect to each quantised delay time a coincidence between the corresponding delayed signal and said second signal;
storing temporarily, and for each of a sequence of instants, information indicating for which of the quantised delay times the count has reached a given number at the corresponding one of said instants,
deriving from said stored information a sequence of signals respectively corresponding to said sequence of instants and wherein each signal of said sequence has a form indicating the quantised delay time or times for which the count has reached said given number at the corresponding one of said instants,
and obtaining an interpolated value representative of delay time by using a plurality of signals of said sequence of signals for computing an interpolated representation of said at least one flow parameter, such computing including deriving, from said plurality of signals, a corresponding plurality of values each representative of the average of the guantised delay times, adding each of such derived values together, and producing an indication of said interpolated value when all said derived values have been added together.

8. A method according to claim 7, further including the step of repeatedly restoring all the counts to zero thereby to form repeated cycles of measurement.

9. A method according to claim 7 wherein said obtaining step comprises
generating pulses at a first frequency before one of said plurality of value has been derived,
generating pulses at a second frequency which is half of the first frequency after said one of said plurality of values has been derived,
counting said generated pulses,
and inhibiting the count at the termination of said received signals, wherein said count at said termination provides the indication of an interpolated value of said delay time.

10. A method according to claim 7, 8 and 9 further comprising the step of obtaining the reciprocal of said indication of an interpolated value of delay time to provide an indication of the rate of said fluid flow.

11. Digital data processing apparatus comprising a shift register having a serial input,
a set of counters respectively corresponding to different stages of the shift register,
gating means operative to cause each counter to count occurrences of a given condition whose occurrence or non-occurrence on each of a sequence of successive occasions is dependent on the state of the stage on that occasion,
a pattern register operable to take in information indicating for which of the stages the count has reached a given number at any instant of a sequence of instants, and to store that information temporarily,
means for deriving from the pattern register a sequence of signals respectively corresponding to said sequence of instants and each of said signals having a form indicating the ordinal number of any stage for which the count has reached said given number at the corresponding one of said instants,
and interpolating means for interpolating a value derived from said sequence of signals, wherein said interpolating means comprises means for receiving a predetermined number of said sequence of signals; computing means responsive to each of said received signals to compute, for each signal, a value indicative of the average of the ordinal numbers corresponding to that signal, means for adding each of the computed values together, and means for producing an output signal when the computed values corresponding to all the predetermined number of received signals have been added together, said output signal providing an indication of said interpolated value derived from said sequence of signals.

12. Apparatus according to claim 11 further including control means operable repeatedly to restore all the counters to a condition of zero count and thereby cause the apparatus to operate in repeated cycles each corresponding to one sequence of said occasions.

13. Apparatus according to claim 11 wherein said interpolating means comprises means for receiving a predetermined number of said sequence of signals, computing means responsive to each of said received signals to compute for each signal a value indicative of the average of the ordinal numbers corresponding to that signal, means for adding each of the computed values together, and means for producing an output signal when the computed values corresponding to all the predetermined number of received signals have been added together, said output signal providing an indication of said interpolated value derived from said sequence of signals;

and wherein said computing means comprises means for detecting said received signals, pulse generating means responsive to said detecting means for generating pulses at a first frequency before one of said received signals has been detected and to generate pulses at a second frequency which is half of the first frequency when said one of said received signals has been detected, means for counting pulses generated by said pulse generating means, and inhibiting said counting means at the termination of said received signals, wherein the contents of said counting means at said termination provide an indication of said interpolated value.

14. Interpolating apparatus for use with a data processing system in which the data processing system provides a sequence of signals corresponding to a sequence of instants, each signal indicating for which of a set of quantised values of a parameter which has satisfied a given condition at each instant, the interpolating apparatus comprising means for receiving a predetermined number of said sequence of signals, computing means responsive to each of said received signals to compute for each signal a value indicative of the average of the quantised values corresponding to that signal, means for adding each of the computed values together, and means for producing an output signal when the computed values corresponding to all the predetermined number of received signals have been added together, said output signal providing an indication of an interpolated value of said parameter.

15. Interpolating apparatus according to claim 14 wherein said computing means comprises means for detecting said received signals, pulse generating means responsive to said detecting means for generating pulses at a first frequency before one of said received signals has been detected and to generate pulses at a second frequency which is half of the first frequency when said one of said received signals has been detected, means for counting pulses generated by said pulse generating means, and inhibiting means responsive to said detecting means for inhibiting said counting means at the termination of said predetermined number of said received signals, wherein the contents of said counting means at said termination provide the output signal.

16. Apparatus for measuring a parameter of the flow of a fluid, said apparatus comprising means for transducing first and second related signals from said flow at different positions along said flow, a shift register having a serial input responsive to said first signal for delaying said first signal by a plurality of quantised delay times in a corresponding plurality of stages in the shift register, a plurality of counters corresponding to said plurality of stages of the shift register, gating means operative to cause each counter to count each occasion on which there occurs coincidence between the delayed first signal in the corresponding stage and said second signal, means including a pattern register connected to said counters for producing pattern signals, each such pattern signal indicating which said counter has reached a given count at some instant, said pattern register temporarily storing a plurality of pattern signals, each pattern signal of said plurality having been produced at a different instant, and each such pattern signal having a form indicating the quantised delay time corresponding to each counter which has reached said given count at the corresponding said instant and means for interpolating a value representative of delay time, said value being derived from said plurality of pattern signals indicating said quantised delay times, whereby to provide an indication of said flow parameter, the last said means comprising computing means for receiving a predetermined number of said plurality of pattern signals and being responsive thereto (1) to compute, for each thereof, a value representative of the quantised delay time corresponding thereto, (2) to sum together all such values, and (3) to derive from said sum an interpolated value representing the actual delay time of said first signal with an accuracy equal to or better than the accuracy with which any said quantised delay time represents said actual delay time.

* * * * *